United States Patent
Park et al.

(10) Patent No.: US 12,136,823 B2
(45) Date of Patent: Nov. 5, 2024

(54) COMPUTER SYSTEM FOR MAXIMIZING WIRELESS ENERGY HARVESTING USING INTELLIGENT REFLECTING SURFACE AND METHOD THEREOF

(71) Applicant: Korea Advanced Institute of Science and Technology, Daejeon (KR)

(72) Inventors: Hyuncheol Park, Daejeon (KR); Min Young Hwang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 180 days.

(21) Appl. No.: 17/810,478

(22) Filed: Jul. 1, 2022

(65) Prior Publication Data

US 2023/0307948 A1    Sep. 28, 2023

(30) Foreign Application Priority Data

Mar. 28, 2022    (KR) .................. 10-2022-0037791

(51) Int. Cl.
*H02J 50/00* (2016.01)
*H02J 50/40* (2016.01)

(52) U.S. Cl.
CPC ............ *H02J 50/001* (2020.01); *H02J 50/40* (2016.02)

(58) Field of Classification Search
CPC ................................. H02J 50/00; H04B 7/00
See application file for complete search history.

(56) References Cited

U.S. PATENT DOCUMENTS

| | | | |
|---|---|---|---|
| 2012/0326660 A1* | 12/2012 | Lu | H02J 50/20 320/108 |
| 2013/0129014 A1* | 5/2013 | Kim | H04L 1/0026 375/295 |
| 2017/0110909 A1* | 4/2017 | Zeine | H02J 50/60 |
| 2023/0283105 A1* | 9/2023 | Lee | H02J 50/20 307/104 |

FOREIGN PATENT DOCUMENTS

KR    10-2021-0066376    6/2021

OTHER PUBLICATIONS

Wu et al., "Towards Smart and Reconfigurable Environment: Intelligent Reflecting Surface Aided Wireless Network," IEEE Communications Magazine, vol. 58, No. 1, pp. 106-112, Jan. 2020.
Chu et al., "A Novel Transmission Policy for Intelligent Reflecting Surface Assisted Wireless Powered Sensor Networks," IEEE Journal of Selected Topics in Signal Processing, vol. 15, No. 5, pp. 1143-1158, Aug. 2021.

* cited by examiner

*Primary Examiner* — Rexford N Barnie
*Assistant Examiner* — Joseph N Inge
(74) *Attorney, Agent, or Firm* — Hamilton, Brook, Smith & Reynolds, P.C.

(57) ABSTRACT

The present disclosure relates to a computer system for maximizing wireless energy harvesting using an intelligent reflection surface and a method thereof. A multi-path channel including a direct channel through which power is directed from an ET apparatus toward an EU apparatus and a reflection channel through which the power is directed from the ET apparatus toward the EU apparatus after being reflected by an IRS apparatus may be implemented. The computer system may be designed to maximize a gain of the multi-path channel in order to maximize the harvested power.

12 Claims, 4 Drawing Sheets

COMPUTER SYSTEM FOR MAXIMIZING WIRELESS ENERGY HARVESTING USING INTELLIGENT REFLECTING SURFACE AND METHOD THEREOF

CROSS-REFERENCES TO RELATED APPLICATIONS

This application is based on and claims priority under 35 U.S.C. § 119 or 365 to Korean Patent Application No. 10-2022-0037791, filed on Mar. 28, 2022 in the Korean intellectual property office, the disclosures of which are herein incorporated by reference in their entireties.

TECHNICAL FIELD

The present disclosure relates to a computer system for maximizing wireless energy harvesting using an intelligent reflection surface and a method thereof.

This patent was supported by the Institute of Information & communications Technology Planning & evaluation (IITP) grant funded by the Korea government (MSIT) (No. 2018-0-00809, Development on the disruptive technologies for beyond 5G mobile communications employing new resources), and the National Research Foundation of Korea (NRF) grant funded by the Korea government (MSIT) (No. NRF-2020R1A2C1101158).

BACKGROUND OF THE DISCLOSURE

Wireless power transfer (simultaneous wireless information and power transfer) (WPT) is a technology for wirelessly supplying power to various small-sized wireless communication devices which constitute an Internet of things (IoT) network. Specifically, in the WPT, a transmitter transfers power to a receiver within several meters by using a radio frequency (RF) signal. The received RF signal is rectified into a direct current (DC) through energy harvest, and the power is supplied to a battery. However, the RF signal experiences a path loss attributable to a multi-path channel while being propagated through a wideband channel. Power of the RF signal that is received by the receiver is greatly reduced. In particular, it is difficult for the receiver to receive the RF signal having sufficient power in an indoor environment in which a non-line-of-sight (NLoS) channel is formed because multiple obstacles are present between the transmitter and the receiver.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure provides a computer system for maximizing wireless energy harvesting using an intelligent reflection surface and a method thereof.

The present disclosure provides a computer system for wireless power transfer. The computer system may include an energy transfer (ET) apparatus configured to transmit power as a wireless signal, an energy user (EU) apparatus configured to harvest power from a received signal, and an intelligent reflection surface (IRS) apparatus configured to reflect the signal from the ET apparatus to the EU apparatus.

According to various embodiments of the present disclosure, in the computer system, a multi-path channel including a direct channel through which power is directed from the ET apparatus toward the EU apparatus and a reflection channel through which the power is directed from the ET apparatus toward the EU apparatus after being reflected by the IRS apparatus may be implemented. The computer system may be designed to maximize a gain of the multi-path channel in order to maximize the harvested power.

The present disclosure provides a method of a computer system for wireless power transfer. The method of the computer system may include transmitting, by an energy transfer (ET) apparatus, power as a wireless signal, reflecting, by an intelligent reflection surface (IRS) apparatus, the signal from the ET apparatus, and harvesting, by an energy user (EU) apparatus, power from at least one of the ET apparatus or the IRS apparatus based on a received signal.

According to various embodiments of the present disclosure, in the computer system, a multi-path channel including a direct channel through which the power is directed from the ET apparatus toward the EU apparatus and a reflection channel through which the power is directed from the ET apparatus toward the EU apparatus after being reflected by the IRS apparatus may be implemented. The computer system may be designed to maximize a gain of the multi-path channel in order to maximize the harvested power.

According to the present disclosure, the computer system may be implemented for wideband wireless power transfer by using the IRS apparatus. Specifically, as a transmission waveform of the ET apparatus is optimized, harvest power can be increased because peak amplitude of a received signal in the EU apparatus is maximized. Furthermore, as reflection phase change values of passive elements of the IRS apparatus are optimized, power transfer efficiency according to an optimum transmission waveform can be greatly maximized. Accordingly, harvest power in the EU apparatus can be maximized because the gain of a multi-path channel is maximized.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, various embodiments of the present disclosure are described with reference to the accompanying drawings.

Figure 1:
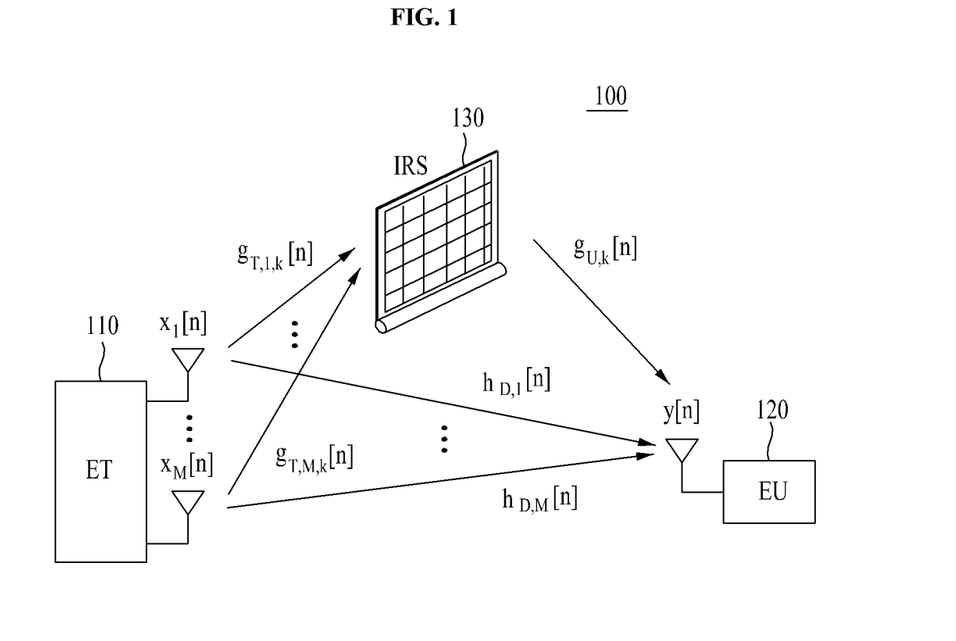
FIG. 1 is a diagram schematically illustrating a computer system according to various embodiments of the present disclosure.

FIG. 1 is a diagram schematically illustrating a computer system 100 according to various embodiments of the present disclosure.

Referring to FIG. 1, the computer system 100 is for downlink wireless power transfer (WPT), and may include an energy transfer (ET) apparatus 110, an energy user (EU) apparatus 120, and an intelligent reflection surface (IRS) apparatus 130. In this case, the computer system 100 may be implemented as a multiple input single output (MISO) system.

The ET apparatus 110 may wirelessly transfer power. To this end, the ET apparatus 110 may have a plurality of, for example, M transmission antennas. Specifically, power to be transmitted to the EU apparatus 120 may be transferred as a transmission signal through the transmission antennas.

The EU apparatus 120 may wirelessly receive power. To this end, the EU apparatus 120 may include one reception antenna and an energy harvester (EH). Specifically, the EU apparatus 120 may receive a received signal through the reception antenna, and may harvest power of the received signal by using the EH.

In this case, the EH of the EU apparatus 120 uses a diode-based rectifier, and may have a non-linear conversion (RF-to-DC conversion) characteristic in which output power is exponentially increased with respect to a received signal having specific power or more due to a non-linear operating characteristic of the diode. In the non-linear operating area of an actual EH, output power is exponentially increased with respect to power of a received signal. Accordingly, a waveform having greater peak amplitude than a WPT waveform having greater average received power has higher power transfer efficiency. Output power obtained through the EH, that is, most of harvest power may be obtained from a peak component of the received signal. In this case, the peak component may mean a component of a signal interval having the greatest amplitude in the received signal during one cycle of the received signal.

The IRS apparatus 130 may be provided between the ET apparatus 110 and the EU apparatus 120. Furthermore, the IRS apparatus 130 may have a plurality of, for example, K passive elements which may be controlled in real time. In the IRS apparatus 130, passive elements may be disposed on a plane surface, that is, an intelligent reflection surface. Accordingly, the IRS apparatus 130 may be applied to a communication environment for various purposes, such as a channel capacity increase, wireless power transfer efficiency improvement, and physical layer security. Specifically, the passive elements change the phase of a signal while reflecting the signal from the ET apparatus 110. Accordingly, a multi-path channel environment advantageous for wireless power transfer can be constructed.

Accordingly, a channel through which power of a received signal is greatly increased in the EU apparatus 120 may be constructed by aligning the phases of a direct channel (ET-EU) through which the power is directed from the ET apparatus 110 toward the EU apparatus 120 and a reflection channel (ET-IRS-EU) through which the power is directed from the ET apparatus 110 toward the EU apparatus 120 after being reflected by the IRS apparatus 130 in phase. That is, in an NLoS channel environment in which wireless power transfer is difficult because an obstacle is present between the ET apparatus 110 and the EU apparatus 120, power transfer efficiency can be improved by constructing a virtual LoS channel using the IRS apparatus 130.

According to various embodiments, the computer system 100 may be implemented for wideband wireless power transfer through the IRS apparatus 130 while taking into consideration a non-linear EH. In order to implement such a computer system 100, an optimum transmission waveform and reflection phase change values of the passive elements of the IRS apparatus 130 need to be designed. A time-reversal (TR) transmission waveform may be designed by inverting a channel impulse response (CIR) of a multi-path channel and performing conjugate-complex on the channel impulse response in the ET apparatus 110. Such a TR transmission waveform generates maximum peak amplitude in the EU apparatus 120 because a multi-path channel and a transmission signal are matched. Accordingly, very great harvest power can be obtained in the computer system 100 having non-linear EH. In this case, the TR received signal may have peak amplitude using a total channel gain of the multi-path channel. Furthermore, a total gain of the multi-path channel can be greatly maximized by forming a virtual LoS multi-path channel through which power is directed from the ET apparatus 110 toward the EU apparatus 120 after being reflected by the IRS apparatus 130, that is, a reflection channel (ET-IRS-EU) in addition to an NLoS multi-path channel present between the ET apparatus 110 and the EU apparatus 120, that is, the direct channel (ET-EU), setting reflection phase change values of the passive elements of the IRS apparatus 130, and aligning the phase of the reflection channel (ET-IRS-EU) with the phase of the direct channel (ET-EU). This will be more specifically described later.

A channel between an m (m=[1, ..., M])-th transmission antenna of the ET apparatus 110 and the EU apparatus 120, that is, the direct channel (ET-EU), may be defined like [Equation 1]. A channel between the m-th transmission antenna of the ET apparatus 110, a k (k=[1, ..., K])-th passive element of the IRS apparatus 130, and the EU apparatus 120, that is, the reflection channel (ET-IRS-EU), may be defined like [Equation 2]. An effective channel (effective ET-EU) between the m-th transmission antenna of the ET apparatus 110 and the EU apparatus 120 may be defined like [Equation 3].

$$h_{D,m}[n] = \sqrt{\gamma_D} \sum_{l=0}^{L_D-1} h_{D,m,l} \delta[n-l], \quad n = 0, \ldots, L_D - 1 \quad \text{[Equation 1]}$$

wherein $L_D$ indicates the number of taps of the direct channel (ET-EU). $\gamma_D$ indicates a channel path loss. $h_{D,m,l} \sim \mathcal{CN}(0, \rho D_{m,l})$ indicates the channel gain of an l-th channel tap. $\rho_{D,m,l}$ indicates the power delay profile of the direct channel (ET-EU), and $\Sigma_{l=0}^{L_D-1} \rho_{D,m,l} = 1$.

$$(g_{T,m,k} * \Theta_k * g_{U,k})[n] = \Theta_k h_{R,m,k}[n], n=0, \ldots, L_R-1 \quad \text{[Equation 2]}$$

wherein $g_{T,m,k}[n]$ may indicate a channel between the m-th transmission antenna and the k-th passive element, that is, a first reflection channel (ET-IRS). $L_T$ may indicate the number of taps of the first reflection channel (ET-IRS). $g_{U,k}[n]$ may indicate a channel between the k-th passive element and the EU apparatus 120, that is, a second reflection channel (IRS-EU). $L_U$ may indicate the number of taps of the second reflection channel (IRS-EU). $L_R = L_T + L_U - 1$ may indicate the number of taps of the reflection channel (ET-IRS-EU). $\Theta_k = \beta_k \exp(j\theta_k)$ may indicate the reflection coefficient of the k-th passive element. $\beta_k \in [0,1]$ may indicate reflection amplitude of the k-th passive element ($\beta_k=1$ for maximum reflection in wireless power transfer). $\theta_k \in [0, 2\pi)$ may indicate a reflection phase change value of the k-th passive element.

$$h_{\mathit{eff},m}[n] = h_{D,m}[n] + \sum_{k=1}^{K}\Theta_k h_{R,m,k}[n], \quad n=0,\ldots,L-1 \qquad \text{[Equation 3]}$$

wherein $L_R=\max\{L_D,L_R\}$ may indicate the number of taps of the effective channel.

The received signal of the EU apparatus 120 may be represented like [Equation 4]. The amount of harvest power achieved in the EU apparatus 120 may be represented like [Equation 5].

$$y[n] = y[n+L] = \sum_{m=1}^{M}\sum_{l=0}^{L-1} h_{\mathit{eff},m}[l]x_m[n-l] + z[n] \qquad \text{[Equation 4]}$$

wherein $x_m[n]$ may indicate the transmission signal of the m-th transmission antenna that have a cycle of L. $\sum_{m=1}^{M}\sum_{l=0}^{L-1}|x_m[l]|^2=P$, and $h_{\mathit{eff},m}[n]$ may indicate the effective channel (effective ET-EU) between the m-th transmission antenna and the EU apparatus 120. $z[n]$ may indicate noise (the noise is neglected because it is very small compared to a power signal in wireless power transfer).

$$P_{out} = \frac{V_{out}^2}{R_L}, \qquad \text{[Equation 5]}$$

$$e^{\frac{V_{out}}{\eta V_0}}\left(1 + \frac{V_{out}}{R_L I_0}\right) \approx \frac{1}{L} e^{\frac{\sqrt{R_s}|y_{peak}|}{\eta V_0}}$$

wherein $R_L$ may indicate a load resistance value. $R_S$ may indicate a resistance value of the reception antenna. $V_0$ may indicate a thermal voltage. $I_0$ may indicate an inverse saturation current. $\eta$ may indicate a diode anomaly coefficient.

$$y_{peak} = \max_{k}|y[k]|$$

may indicate the peak component of the received signal.

As described above, the computer system 100 may be implemented for wideband wireless power transfer through the IRS apparatus 130 while taking into consideration the non-linear EH. Most of harvest power obtained in the non-linear EH may be obtained from a peak component of a received signal. The TR transmission waveform may generate the peak component of the received signal using a total channel gain of a multi-path channel which is propagated like [Equation 6] and [Equation 7]. Accordingly, in order to achieve the computer system 100, power may be transmitted by optimizing reflection phase change values of the passive elements of the IRS apparatus 130 and designing the TR transmission waveform for the optimized effective channel (effective ET-EU) so that the effective channel (effective ET-EU) can maximize the total channel gain.

$$|y[L-1]| = \qquad \text{[Equation 6]}$$

$$\left|\sum_{m=1}^{M}h_m^T x_m\right| \le \sqrt{\left(\sum_{m=1}^{M}\|h_m\|^2\right)\left(\sum_{m=1}^{M}\|x_m\|^2\right)} = \sqrt{P_x P_h}$$

wherein $h_m=[h_m[0],\ldots,h_m[L-1]]^T$, and $P_h=\sum_{m=1}^{M}\|h_m\|^2$ may indicate the total channel gain. $x_m=[x_m[0],\ldots,x_m[L-1]]^T$, and $P_x=\sum_{m=1}^{M}\|x_m\|^2$ may indicate the transmission waveform power.

$$\left|y_{peak}^{TR}\right| = \left|\sum_{m=1}^{M}h_m^T x_m^{TR}\right| = \sqrt{P_x P_h} \qquad \text{[Equation 7]}$$

wherein $$x_m = [x_m^{TR}[0],\ldots,x_m^{TR}[L-1]]^T = \frac{\sqrt{P_x}}{\sqrt{P_h}}[h_m^*[0],\ldots,h_m^*[L-1]]^T.$$

Prior to the optimization of the reflection phase change values of the passive elements of the IRS apparatus 130, a peak component of the received signal may be analyzed when the TR transmission waveform is designed and transmitted with respect to the effective channel (effective ET-EU). The TR transmission waveform is constructed by inverting the effective channel (effective ET-EU) between the m-th transmission antenna of the ET apparatus 110 and the EU apparatus 120, that is, disposing the effective channel (effective ET-EU), in reverse order and performing conjugate-complex on the effective channel. This may be represented like [Equation 8]. The peak component of the received signal for the TR transmission waveform, which is achieved before the reflection phase change values of the passive elements of the IRS apparatus 130 are maximized, may be represented like [Equation 9]. The peak component of the received signal may be represented like [Equation 10] by arranging the peak component with respect to the sum of the direct channel (ET-EU) and the reflection channel (ET-IRS-EU).

$$x_m^{TR}[n] = \frac{\sqrt{P}\, h_{\mathit{eff},m}^*[L-1-n]}{\sqrt{\sum_{m=1}^{M}\sum_{l=0}^{L-1}|h_{\mathit{eff},m}[l]|^2}} \qquad \text{[Equation 8]}$$

$$y_{peak}^{TR} = \qquad \text{[Equation 9]}$$

$$\frac{\sqrt{P}\sum_{m=1}^{M}\sum_{l=0}^{L-1} h_{\mathit{eff},m}[l]h_{\mathit{eff},m}^*[l]}{\sqrt{\sum_{m=1}^{M}\sum_{l=0}^{L-1}|h_{\mathit{eff},m}[l]|^2}} = \sqrt{P\sum_{m=1}^{M}\sum_{l=0}^{L-1}|h_{\mathit{eff},m}[l]|^2}$$

$$y_{peak}^{TR} = \sqrt{P\sum_{m=1}^{M}\sum_{l=0}^{L-1}\left|h_{D,m}[l] + \sum_{k=1}^{K}\Theta_k h_{R,m,k}[l]\right|^2} \qquad \text{[Equation 10]}$$

wherein $h_{D,m}[l]$ may indicate the direct channel (ET-EU). $h_{R,m,k}[l]$ may indicate the reflection channel (ET-IRS-EU).

When the phases of the direct channel (ET-EU) and the reflection channel (ET-IRS-EU) are aligned by optimizing the reflection phase change values of the passive elements of the IRS apparatus 130, the amplitude of the peak component of the received signal can be increased. The peak component of the received signal may be represented in the form of a matrix vector product like [Equation 11].

$$\gamma_{peak}^{TR} = \sqrt{P\left\|H\begin{bmatrix}1\\ \Theta\end{bmatrix}\right\|_2^2} \qquad \text{[Equation 11]}$$

wherein $H=[H_1^T,\ldots,H_M^T]^T \in \mathbb{C}^{ML\times(K+1)}$ may indicate an effective channel matrix.

$$H_m = \begin{bmatrix} h_{D,m}[0] & h_{R,m,1}[0] & \cdots & h_{R,m,K}[0] \\ \vdots & \vdots & \ddots & \vdots \\ h_{D,m}[L-1] & h_{R,m,1}[L-1] & \cdots & h_{R,m,K}[L-1] \end{bmatrix}$$

may indicate the effective channel matrix between the m-th transmission antenna and the EU apparatus 120. $\Theta=[\Theta_1, \ldots, \Theta_K]^T \in \mathbb{C}^{K \times 1}$ may indicate a reflection coefficient vector of the passive elements of the IRS apparatus 130. A first component of a vector $$\begin{bmatrix} 1 \\ \Theta \end{bmatrix}$$

multiplied by the effective channel matrix may be fixed to 1 because only the phase of the reflection channel (ET-IRS-EU) may be changed and the phase of the direct channel (ET-EU) cannot be changed in the passive elements of the IRS apparatus 130.

In this case, the peak component of the received signal has an L2-norm form of a linear conversion. A corresponding value may become a maximum when the vector $$\begin{bmatrix} 1 \\ \Theta \end{bmatrix}$$

is a dominant right singular vector of the effective channel matrix. The dominant right singular vector of the effective channel matrix may be represented like [Equation 12] as a right singular vector corresponding to the greatest singular vector of the effective channel matrix.

$$v_{max}=[v_{max,0}, \ldots, v_{max,K}] \in \mathbb{C}^{K+1} \quad \text{[Equation 12]}$$

Furthermore, the magnitude of the reflection coefficients of the passive elements is 1 (i.e., $|\Theta_k|=1 \; \forall k$) and only the phases thereof are changed. Accordingly, an optimal vector $$\begin{bmatrix} 1 \\ \Theta^* \end{bmatrix}$$

may be constructed as a phase of $v_{max}$ like [Equation 13]. In this case, the first component of the vector $$\begin{bmatrix} 1 \\ \Theta^* \end{bmatrix}$$

may be set to 1 by subtracting $-\sphericalangle v_{max,0}$ from the phase of $V_{max}$.

$$\begin{bmatrix} 1 \\ \Theta^* \end{bmatrix} = \begin{bmatrix} 1, e^{\iota \sphericalangle v_{max,1} - \iota \sphericalangle v_{max,0}}, \ldots, e^{\iota \sphericalangle v_{max,K} - \iota \sphericalangle v_{max,0}} \end{bmatrix}^T \quad \text{[Equation 13]}$$

As a result, the TR transmission waveform of the effective channel (effective ET-EU) in which the reflection phase change values of the passive elements of the IRS apparatus 130 are maximized may be designed like [Equation 14].

$$x_m^{TR*}[n] = \frac{\sqrt{P}\left(h_{eff,m}^*[L-1-n]\right)^*}{\sqrt{\sum_{m=1}^{M}\sum_{l=0}^{L-1}\left|h_{eff,m}^*[l]\right|^2}} \quad \text{[Equation 14]}$$

wherein $$h_{eff,m}^*[n] = h_{D,m}[n] + \sum_{k=1}^{K} \Theta_k^* h_{R,m,k}[n].$$

In some embodiments, if the influence of the direct channel (ET-EU) is small to the extent that the influence can be neglected compared to the reflection channel (ET-IRS-EU) and a channel impulse response (CR) cannot be obtained, wireless power transfer through a virtual LoS path may be performed by aligning the phase of the reflection channel (ET-IRS-EU) in phase and designing the TR transmission waveform of the reflection channel (ET-IRS-EU). In this case, the channel between the m-th transmission antenna and the EU apparatus 130 may be defined like [Equation 15]. In such a case, optimal reflection coefficients of the passive elements of the IRS apparatus 130 may be designed like [Equation 16] from the aforementioned design process. Furthermore, the TR transmission waveform of the effective channel (effective ET-EU) in which the reflection phase change values of the passive elements of the IRS apparatus 130 are maximized may be designed like [Equation 17].

$$h_{D,m}[n] = 0, \quad \forall n \quad \text{[Equation 15]}$$

$$h_{eff,m}[n] = \sum_{k=1}^{K} \Theta_k h_{R,m,k}[n], \; n = 0, \ldots, L_R - 1$$

$$\Theta^* = [e^{\sphericalangle v_{max,1}}, \ldots, e^{-\sphericalangle v_{max,K}}]^T \quad \text{[Equation 16]}$$

wherein $V_{max}=[v_{max,1}, \ldots, v_{max,K}] \in \mathbb{C}^K$ may indicate the dominant right singular vector of the effective channel matrix. $H=[H_1^T, \ldots, H_M^T]^T \in \mathbb{C}^{ML_R \times K}$ may indicate the effective channel matrix.

$$H_m = \begin{bmatrix} h_{R,m,1}[0] & \cdots & h_{R,m,K}[0] \\ \vdots & \ddots & \vdots \\ h_{R,m,1}[L_R-1] & \cdots & h_{R,m,K}[L_R-1] \end{bmatrix}$$

may indicate the effective channel matrix between the m-th transmission antenna and the EU apparatus 120.

$$x_m^{TR*}[n] = \frac{\sqrt{P}\left(\sum_{k=1}^{K} \Theta_k^* h_{R,m,k}[L-1-n]\right)^*}{\sqrt{\sum_{m=1}^{M}\sum_{l=0}^{L-1}\left|\sum_{k=1}^{K} \Theta_k^* h_{R,m,k}[l]\right|^2}} \quad \text{[Equation 17]}$$

In some embodiments, if the number of taps of all channel paths is set to 1 by taking into consideration a narrowband channel (i.e., L=1), the TR transmission waveform described as described above may be modified into active beamforming of the ET apparatus 110. The reflection coefficient of the IRS apparatus 130 that has been optimized as described above may be modified and applied as passive beamforming of the IRS apparatus 130. In such a case, when the aforementioned design process is performed on the case of L=1, the passive beamforming of the IRS apparatus 130 may be designed like [Equation 18]. Furthermore, the active beamforming of the ET apparatus 110 may be designed like [Equation 19].

$$\Theta^* = [e^{\sphericalangle v_{max,1} - \sphericalangle v_{max,0}}, \ldots, e^{-\sphericalangle v_{max,K} - \sphericalangle v_{max,0}}]^T \quad \text{[Equation 18]}$$

wherein $v_{max}=[v_{max,0}, \ldots, v_{max,K}] \in \mathbb{C}^{K+1}$ may indicate the dominant right singular vector of the effective channel matrix. $\mathbb{C}$ $$H = \begin{bmatrix} h_{D,1} & h_{R,1,1} & \cdots & h_{R,1,K} \\ \vdots & \vdots & \ddots & \vdots \\ h_{D,M} & h_{R,M,1} & \cdots & h_{R,M,K} \end{bmatrix} \in \mathbb{C}^{M \times (K+1)}$$

may indicate the effective channel matrix.

$$x^{Active*} = \frac{\sqrt{P}}{\sqrt{\sum_{m=1}^{M} |h^*_{eff,m}|^2}} [h^*_{eff,1}, \ldots, h^*_{eff,M}]^T \quad \text{[Equation 19]}$$

wherein H*$_{eff,m}$ may indicate a channel between the m-th transmission antenna and the EU apparatus 120 to which an optimized reflection coefficient of the IRS apparatus 130 has been applied, and may be defined like [Equation 20].

$$h^*_{eff,m} = h_{D,m} + \sum_{k=1}^{K} \Theta^*_k h_{R,m,k} \quad \text{[Equation 20]}$$

In summary, the present disclosure provides the computer system 100 for wireless power transfer. The computer system 100 may include the ET apparatus 110 configured to transmit power as a wireless signal, the EU apparatus 120 configured to harvest power from a received signal, and the IRS apparatus 130 configured to reflect the signal from the ET apparatus 110 to the EU apparatus 120.

According to various embodiments, in the computer system 100, a multi-path channel including a direct channel (ET-EU) through which power is directed from the ET apparatus 110 toward the EU apparatus 120 and a reflection channel (ET-IRS-EU) through which the power is directed from the ET apparatus 110 toward the EU apparatus 120 after being reflected by the IRS apparatus 130 may be implemented.

According to various embodiments, the computer system 100 may be designed to maximize the gain of the multi-path channel in order to maximize the harvested power.

According to various embodiments, a transmission waveform of the transmitted signal may be designed so that the transmitted signal is matched with the multi-path channel and peak amplitude is periodically generated from the received signal.

According to various embodiments, the transmission waveform may be designed based on a channel impulse response of the multi-path channel in a time domain.

According to various embodiments, the transmission waveform may be designed by disposing the channel impulse response of the multi-path channel in reverse order of time and performing conjugate-complex on the channel impulse response.

According to various embodiments, the EU apparatus 120 includes an energy harvester output power of which is exponentially increased with respect to the power of the received signal, and may harvest the output power.

According to various embodiments, the harvested power may be maximized as the peak amplitude periodically occurs from the received signal.

According to various embodiments, a reflection phase change value of the IRS apparatus 130 may be designed so that a phase of the reflection channel (ET-IRS-EU) is aligned with a phase of the direct channel (ET-EU).

According to various embodiments, a gain of the multi-path channel may be increased as a phase difference between the phase of the reflection channel (ET-IRS-EU) and the phase of the direct channel (ET-EU) becomes small.

According to various embodiments, amplitude of a peak component in the received signal may be increased as the phase of the reflection channel (ET-IRS-EU) and the phase of the direct channel (ET-EU) are aligned, so that the gain of the multi-path channel can be maximized.

According to various embodiments, the ET apparatus 110 may include a plurality of transmission antennas. The IRS apparatus 130 may include a plurality of passive elements. The peak component of the received signal may be represented in the form of a matrix vector product of a vector including an effective channel matrix between the transmission antennas and the EU apparatus 120 and reflection coefficient vectors of the passive elements.

According to various embodiments, the reflection coefficient vector may be set by using a phase component of a dominant right singular vector of the effective channel matrix through singular vector decomposition.

According to various embodiments, if the direct channel (ET-EU) and the reflection channel (ET-IRS-EU) are narrowband channels in the multi-path channel, a transmission waveform of the transmitted signal may be modified into active beamforming of the ET apparatus 110, and the reflection coefficient vector be modified into passive beamforming of the IRS apparatus 130.

Figure 2:
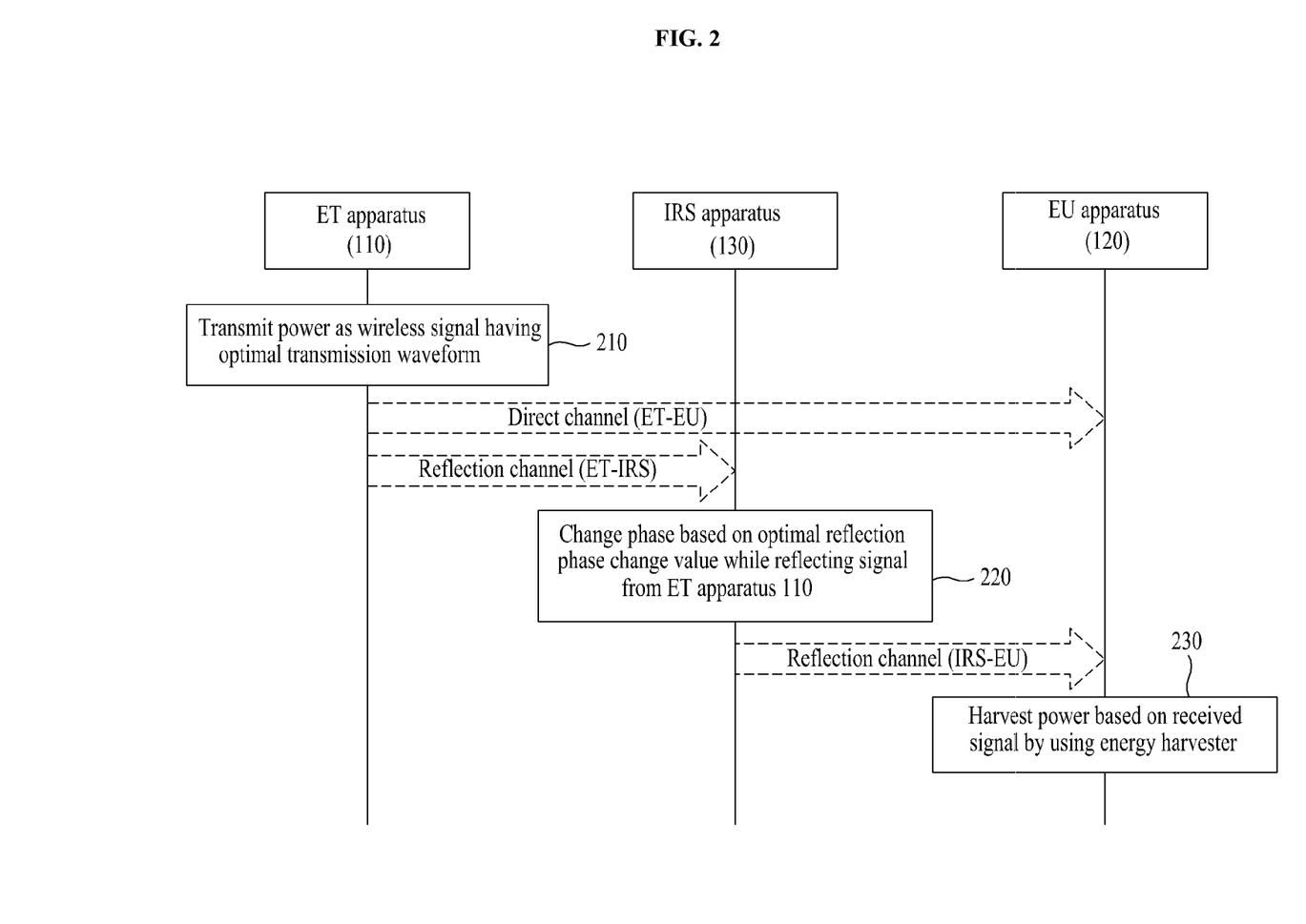
FIG. 2 is a diagram schematically illustrating a method of the computer system according to various embodiments of the present disclosure.

FIG. 2 is a diagram schematically illustrating a method of the computer system 100 according to various embodiments of the present disclosure.

Referring to FIG. 2, in step 210, the ET apparatus 110 may transmit power as a wireless signal. To this end, the ET apparatus 110 may have a plurality of, for example, M transmission antennas. Specifically, the ET apparatus 110 may transfer power to be delivered to the EU apparatus 120 as a wireless signal through the transmission antennas. In this case, the ET apparatus 110 may transfer the transmission signal in the form of an optimally designed transmission waveform.

Next, in step 220, the IRS apparatus 130 may reflect the signal from the ET apparatus 110. The IRS apparatus 130 may be provided between the ET apparatus 110 and the EU apparatus 120. Furthermore, the IRS apparatus 130 may have a plurality of, for example, K passive elements which may be controlled in real time. The passive elements may be disposed on a plane surface in the IRS apparatus 130. Specifically, the passive elements may change the phase of the signal while reflecting the signal from the ET apparatus 110. In this case, the passive elements may change the phase based on an optimally designed reflection phase change value.

Next, in step 230, the EU apparatus 120 may harvest power from at least one of the ET apparatus 110 or the IRS apparatus 130 based on the received signal. To this end, the EU apparatus 120 may include the one reception antenna and the energy harvester (EH). Specifically, the EU apparatus 120 may receive a wireless signal through the reception antenna, and may harvest power of the received signal by using the EH.

According to various embodiments, in the computer system 100, a multi-path channel including a direct channel (ET-EU) through which power is directed from the ET apparatus 110 toward the EU apparatus 120 and a reflection channel (ET-IRS-EU) through which the power is directed from the ET apparatus 110 toward the EU apparatus 120 after being reflected by the IRS apparatus 130 may be implemented.

According to various embodiments, the computer system 100 may be designed to maximize the gain of the multi-path channel in order to maximize the harvested power.

According to various embodiments, a transmission waveform of the transmitted signal may be designed so that the transmitted signal is matched with the multi-path channel and peak amplitude is periodically generated from the received signal.

According to various embodiments, the transmission waveform may be designed based on a channel impulse response of the multi-path channel in a time domain.

According to various embodiments, the transmission waveform may be designed by disposing the channel impulse response of the multi-path channel in reverse order of time and performing conjugate-complex on the channel impulse response.

According to various embodiments, the EU apparatus 120 includes an energy harvester output power of which is exponentially increased with respect to the power of the received signal, and may harvest the output power.

According to various embodiments, the harvested power may be maximized as the peak amplitude periodically occurs from the received signal.

According to various embodiments, a reflection phase change value of the IRS apparatus 130 may be designed so that a phase of the reflection channel (ET-IRS-EU) is aligned with a phase of the direct channel (ET-EU).

According to various embodiments, a gain of the multi-path channel may be increased as a phase difference between the phase of the reflection channel (ET-IRS-EU) and the phase of the direct channel (ET-EU) becomes small.

According to various embodiments, amplitude of a peak component in the received signal may be increased as the phase of the reflection channel (ET-IRS-EU) and the phase of the direct channel (ET-EU) are aligned, so that the gain of the multi-path channel can be maximized.

According to various embodiments, the ET apparatus 110 may include a plurality of transmission antennas. The IRS apparatus 130 may include a plurality of passive elements. The peak component of the received signal may be represented in the form of a matrix vector product of a vector including an effective channel matrix between the transmission antennas and the EU apparatus 120 and reflection coefficient vectors of the passive elements.

According to various embodiments, the reflection coefficient vector may be set by using a phase component of a dominant right singular vector of the effective channel matrix through singular vector decomposition.

According to various embodiments, if the direct channel (ET-EU) and the reflection channel (ET-IRS-EU) are narrowband channels in the multi-path channel, a transmission waveform of the transmitted signal may be modified into active beamforming of the ET apparatus 110, and the reflection coefficient vector be modified into passive beamforming of the IRS apparatus 130.

Figure 3:
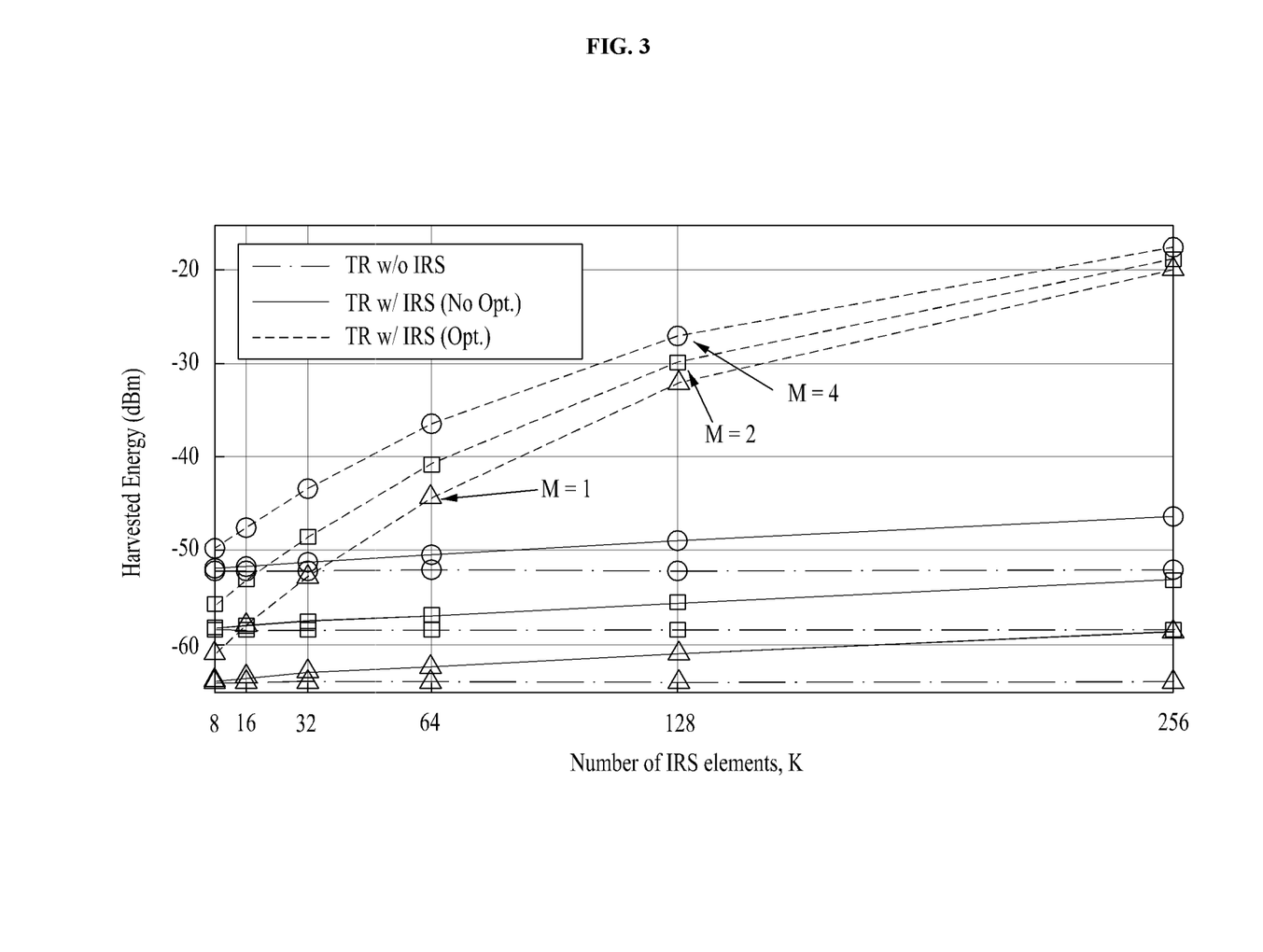
FIGS. 3 and 4 are diagrams for describing performance of the computer system according to various embodiments of the present disclosure.
Figure 4:
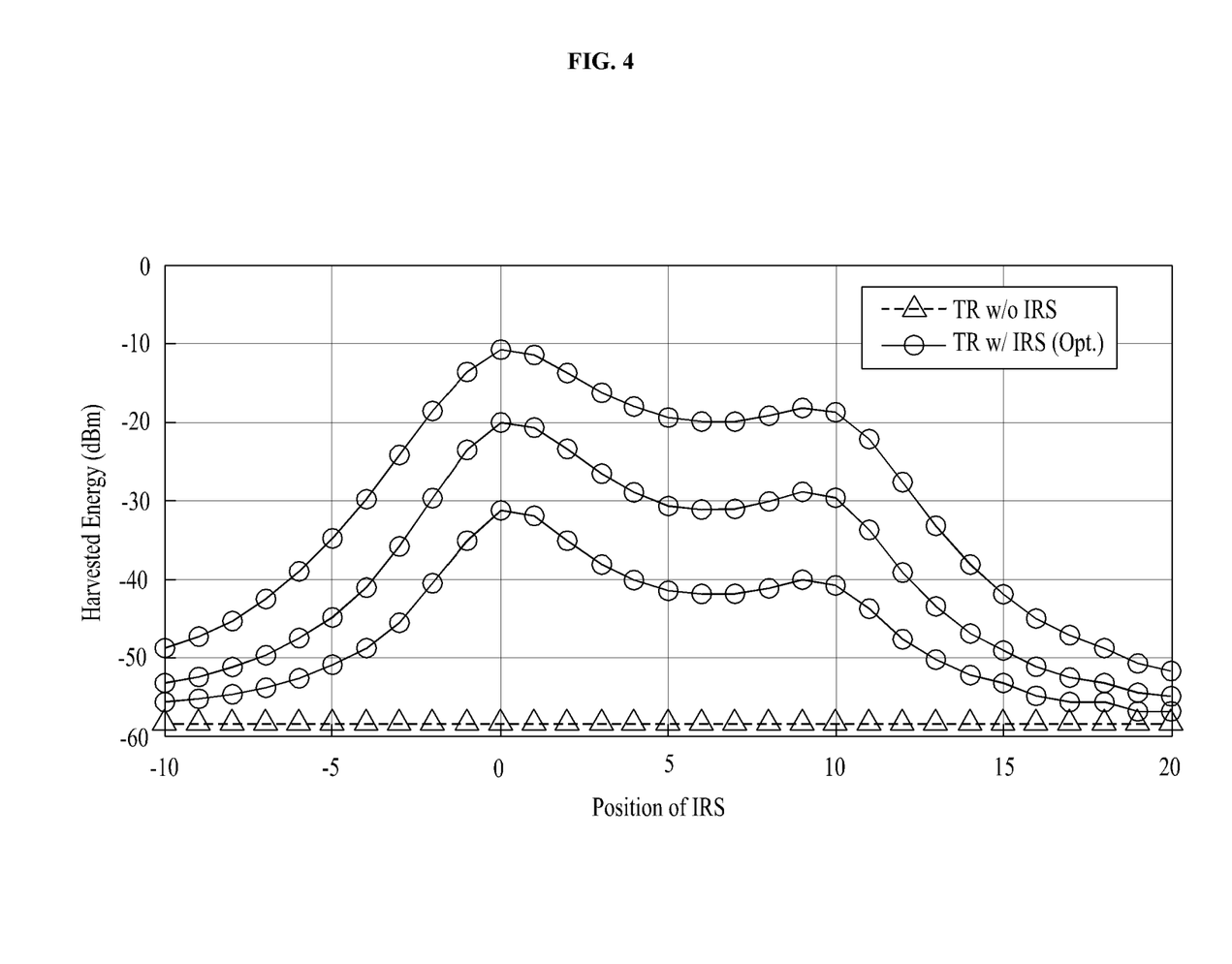

FIGS. 3 and 4 are diagrams for describing performance of the computer system 100 according to various embodiments of the present disclosure.

In order to verify performance of the computer system 100 according to various embodiments, a simulation environment was constructed as follows: a center frequency $(f_C)$=915 MHz, a transmission signal bandwidth (B)=20 MHz, a load resistance value $(R_L)$=1.6 kΩ, a resistance value $(R_S)$ of a reception antenna=50Ω, a thermal voltage $(V_O)$=25.86 Mv, an inverse saturation current $(I_O)$=μA, and an diode anomaly coefficient (η)=1.05.

In such a simulation environment, as illustrated in FIG. 3, when the number M of transmission antennas was 1, 2, and 4, the number of passive elements of the IRS apparatus 130 was increased from 8 to 256, and the amount of harvest power was measured. In this case, power of the transmission waveform was set to 40 dBm (10 W), a distance (NLoS) between the ET apparatus 110 and the EU apparatus 120 was set to 10 m, a distance (NLoS) between the ET apparatus 110 and the IRS apparatus 130 was set to 10.198 m, and a distance (LoS) between the IRS apparatus 130 and the EU apparatus 120 was set to 2 m. Harvest power when a TR transmission waveform not supported by the IRS apparatus 130 was transmitted was −63.8 dBm, −58.3 dBm, and −52 dBm when the number M of transmission antennas was 1, 2, and 4, respectively. In contrast, harvest power when a TR transmission waveform supported by the IRS apparatus 130 consisting of 256 passive elements reflection phase change values of which were maximized was transmitted showed very excellent harvest performance as −19.9 dBm (43.9 dB gain), −18.9 dBm (39.4 dB gain), and −17.6 dBm (34.4 dB gain) when the number M of transmission antennas was 1, 2, and 4, respectively.

In such a simulation environment, as illustrated in FIG. 4, assuming a two-dimensional coordinate system, the ET apparatus 110 having two transmission antennas was disposed at a starting point (0,0), the EU apparatus 120 was disposed at a location (10,0) that is 10 m away from the starting point, and the amount of harvest power was measured while the location of the IRS apparatus 130 was changed from (−10,2) to (20,2) at intervals of 2 m. Red lines indicate harvest power when the number of passive elements of the IRS apparatus 130 was 64, 128, and 256 from the bottom of a graph in FIG. 4. The IRS apparatus 130 showed the best power transfer performance when the IRS apparatus 130 was disposed at a location closest to the ET apparatus 110, and a maximum power gain of 47 dB could be obtained when the number of passive elements was 256. The reason for this is that a total channel gain was increased when the IRS apparatus 130 was disposed at a location (0,2) where a path (NLoS) from the ET apparatus 110 to the IRS apparatus 130 was shortened because a propagation loss according to the path (NLoS) from the ET apparatus 110 to the IRS apparatus 130 was greater than that according to a path (LoS) from the IRS apparatus 130 to the EU apparatus 120.

Accordingly, the present disclosure can be flexibly extended as the number of transmission antennas of the ET apparatus 110 and the number of passive elements of the IRS apparatus 130 are increased. That is, the present disclosure can be flexibly extended in a time domain by using a channel impulse response of the transmission antennas and the passive elements. Furthermore, the present disclosure can greatly improve output power of the EH by using a path for more wireless channels as the number of transmission antennas and the number of passive elements are increased.

According to the present disclosure, the computer system 100 may be implemented for wideband wireless power transfer by using the IRS apparatus 130. Specifically, as a transmission waveform of the ET apparatus 110 is maximized, harvest power can be increased because peak amplitude of a received signal in the EU apparatus 120 is maximized. Furthermore, as reflection phase change values of the passive elements of the IRS apparatus 130 are maximized, power transfer efficiency according to an optimum transmission waveform can be greatly maximized. Accordingly, as the gain of a multi-path channel is maximized, harvest power in the EU apparatus 120 can be maximized.

The present disclosure may be efficiently applied to an IoT network market because the computer system 100 can be implemented with low complexity and may be disposed at a location in which the supply of power is difficult or can support various wireless devices having high power usage. Specifically, there is an increasing demand for the development of the wireless communication technology and for a technology in which an IoT network is constructed in a home, an office, a factory, etc. and power is wirelessly supplied to various wireless devices that constitute an IoT network. According to the present disclosure, great convenience can be provided in maintenance and management because power can be efficiently transferred to a wireless device at a location in which the transfer of power is difficult due to multiple obstacles, and a wireless device can be freely disposed. Furthermore, user convenience can be greatly improved because sufficient power for charging a battery can be supplied by intensively transferring power to a smart device having high power usage by using the IRS apparatus.

The aforementioned device may be implemented as a hardware component, a software component and/or a combination of a hardware component and software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor, or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, or a computer storage medium or device in order to be interpreted by the processing device or to provide an instruction or data to the processing device. The software may be distributed to computer systems connected over a network and may be stored or executed in a distributed manner. The software and the data may be stored in one or more computer-readable recording media.

The method according to various embodiments may be implemented in the form of a program instruction executable by various computer means and stored in a computer-readable medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include recording media and/or storage media managed in an app store in which apps are distributed, a site in which various other pieces of software are supplied or distributed, a server, etc.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" or "the second", may modify corresponding elements regardless of its sequence or importance, and are used to only distinguish one element from the other element and do not limit corresponding elements. When it is described that one (e.g., a first) element is "(functionally or communicatively) connected to" or "coupled with" the other (e.g., a second) element, one element may be directly connected to the other element or may be connected to the other element through another element (e.g., a third element).

The term "module" used in this document may include a unit implemented as hardware, software or firmware, and may be interchangeably used with a term, such as logic, a logical block, a part, or a circuit. The module may be an integrated part or a minimum unit in which one or more functions are performed or a part thereof. For example, the module may be implemented as an application-specific integrated circuit (ASIC).

According to various embodiments, each (e.g., a module or a program) of the aforementioned elements may include a single entity or a plurality of entities. According to various embodiments, one or more of the aforementioned components or steps may be omitted or one or more other components or steps may be added. Alternatively or additionally, a plurality of components (e.g., modules or programs) may be integrated into a single component. In such a case, the integrated component may identically or similarly perform a function performed by a corresponding one of the plurality of components before one or more functions of each of the plurality of components. According to various embodiments, steps performed by a module, a program or another component may be executed sequentially, in parallel, iteratively or heuristically, or one or more of the steps may be executed in different order or may be omitted, or one or more other steps may be added.

The invention claimed is:

1. A computer system for wireless power transfer, comprising:
an energy transfer (ET) apparatus including a plurality of transmission antennas configured to transmit power as a wireless signal;
an energy user (EU) apparatus configured to harvest power from a received signal received by the EU apparatus; and an intelligent reflection surface (IRS) apparatus including a plurality of passive elements configured to reflect the signal from the ET apparatus to the EU apparatus, wherein in the computer system, a multi-path channel comprising a direct channel through which the power is directed from the ET apparatus toward the EU apparatus and a reflection channel through which the power is directed from the ET apparatus toward the EU apparatus after being reflected by the IRS apparatus is implemented, and wherein the computer system is designed to maximize a gain of the multi-path channel in order to maximize the harvested power, wherein the computer system sets reflection phase change values for the passive elements based on an analysis for a peak component of the received signal such that the gain of the multi-path channel is maximized and a phase of the reflection channel is aligned with a phase of the direct channel, wherein, based on the set reflection phase change values, the passive elements change a phase of a signal transmitted from the ET apparatus to the IRS apparatus so that the phase of the reflection channel is aligned with the phase of the direct channel, and wherein the peak component of the received signal is represented in a form of a matrix vector product of a vector comprising an effective channel matrix between the transmission antennas and the EU apparatus and reflection coefficient vectors of the passive elements.

2. The computer system of claim 1, wherein a transmission waveform of the transmitted signal is designed so that the transmitted signal is matched with the multi-path channel and peak amplitude is periodically generated from the received signal.

3. The computer system of claim 2, wherein the transmission waveform is designed based on a channel impulse response of the multi-path channel in a time domain.

4. The computer system of claim 3, wherein the transmission waveform is designed by disposing a channel impulse response of the multi-path channel in reverse order of time and performing conjugate-complex on the channel impulse response.

5. The computer system of claim 2, wherein the EU apparatus comprises an energy harvester output power of which is exponentially increased with respect to the power of the received signal, and harvests the output power, and
wherein the harvested power is maximized as the peak amplitude periodically occurs from the received signal.

6. The computer system of claim 1, wherein the reflection coefficient vector is set by using a phase component of a dominant right singular vector of the effective channel matrix through singular vector decomposition.

7. The computer system of claim 1, wherein if the direct channel and the reflection channel are narrowband channels in the multi-path channel, a transmission waveform of the transmitted signal is modified into active beamforming of the ET apparatus, and the reflection coefficient vector be modified into passive beamforming of the IRS apparatus.

8. A method of a computer system for wireless power transfer, the method comprising:
transmitting, by an energy transfer (ET) apparatus including a plurality of transmission antennas, power as a wireless signal;
reflecting, by an intelligent reflection surface (IRS) apparatus including a plurality of passive elements, the signal from the ET apparatus; and
harvesting, by an energy user (EU) apparatus, power from at least one of the ET apparatus or the IRS apparatus based on a received signal received by the EU apparatus,
wherein in the computer system, a multi-path channel comprising a direct channel through which the power is directed from the ET apparatus toward the EU apparatus and a reflection channel through which the power is directed from the ET apparatus toward the EU apparatus after being reflected by the IRS apparatus is implemented, and
wherein the computer system is designed to maximize a gain of the multi-path channel in order to maximize the harvested power,
wherein the computer system sets reflection phase change values for the passive elements based on an analysis for a peak component of the received signal such that the gain of the multi-path channel is maximized and a phase of the reflection channel is aligned with a phase of the direct channel,
wherein, based on the set reflection phase change values, the passive elements change a phase of a signal transmitted from the ET apparatus to the IRS apparatus so that the phase of the reflection channel is aligned with the phase of the direct channel, and
wherein the peak component of the received signal is represented in a form of a matrix vector product of a vector comprising an effective channel matrix between the transmission antennas and the EU apparatus and reflection coefficient vectors of the passive elements.

9. The method of claim 8, wherein a transmission waveform of the transmitted signal is designed so that the transmitted signal is matched with the multi-path channel and peak amplitude is periodically generated from the received signal.

10. The method of claim 9, wherein the transmission waveform is designed based on a channel impulse response of the multi-path channel in a time domain.

11. The method of claim 10, wherein the transmission waveform is designed by disposing a channel impulse response of the multi-path channel in reverse order of time and performing conjugate-complex on the channel impulse response.

12. The method of claim 9, wherein the EU apparatus comprises an energy harvester output power of which is exponentially increased with respect to the power of the received signal, and harvests the output power, and
wherein the harvested power is maximized as the peak amplitude periodically occurs from the received signal.

* * * * *